April 1, 1924.
W. H. SAMMONS
Re. 15,808
COMB
Original Filed April 9, 1920
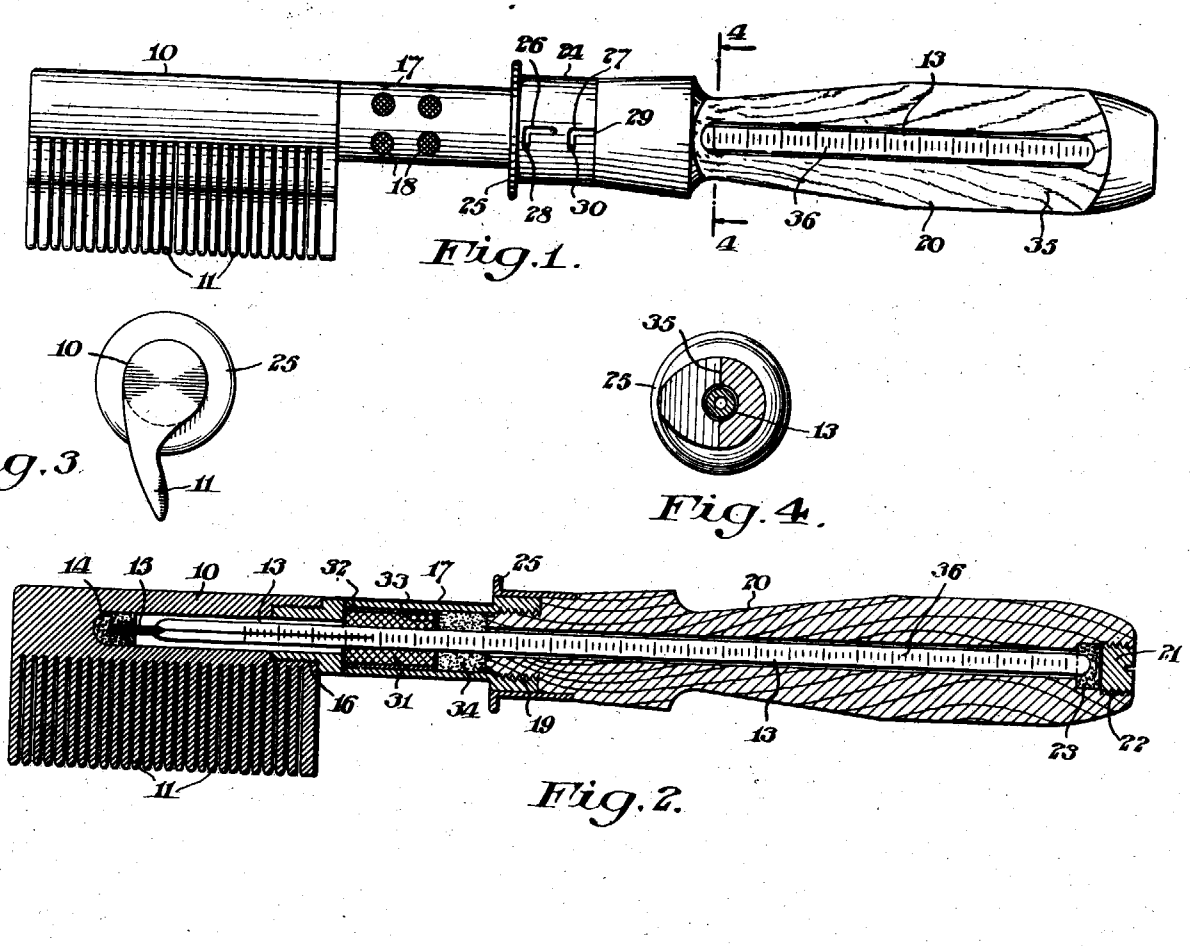
Inventor:
Walter H. Sammons,
By Butler & Denny
Attorneys Reissued Apr. 1, 1924. Re. 15,808

UNITED STATES PATENT OFFICE.

WALTER H. SAMMONS, OF PHILADELPHIA, PENNSYLVANIA.

COMB.

Original No. 1,362,823, dated December 21, 1920, Serial No. 372,611, filed April 9, 1920. Application for reissue filed November 28, 1921. Serial No. 518,451.

*To all whom it may concern:*

Be it known that I, WALTER HENRY SAMMONS, a citizen of the United States, residing at Philadelphia, in the county of Philadelphia and State of Pennsylvania, have invented new and useful Improvements in Combs, of which the following is a specification.

This invention relates to combs and it has more particular reference to that type of hair straightening or kink removing combs which are previously heated before application to the hair.

Many devices of the nature referred to have been marketed and used heretofore but all have been more or less unsatisfactory due to the fact that when placed in other than very experienced hands they have resulted in irreparable damage to the hair and not infrequently injury to the hands of the user.

Now the main object of my invention is to provide a comb of the character referred to which overcomes all of the inherent disadvantages and objectionable features associated with such articles as heretofore constructed, and to this end my invention consists essentially in housing within the body of the comb proper, a thermometer, which extends axially longitudinally therefrom into the handle where readings can be taken and in insulating said handle from the comb in such a manner that any conduction of heat thereto is effectively prevented.

In the further disclosure of the invention reference is to be had to the accompanying sheet of explanatory drawings constituting a part of this specification, and in which like characters of reference designate the same or similar parts in all the views.

Figure 1 is an elevation of my improved comb.

Figure 2 is a longitudinal section of the same.

Figure 3 is an end view looking toward the right hand of Fig. 1; and

Fig. 4 is a transverse section on the line 4—4 in Fig. 1.

Referring to the drawings the numeral 10 designates the comb head of suitable metal and substantially circular in cross section and provided with wiper formation teeth 11 projecting therefrom at right angles to its longitudinal axis. The comb head 10 is cored out or hollowed to provide an axially central chamber in which is housed the lower part of a thermometer 13 an asbestos seat or cup 14 fitting thereinto and on the reduced portion 15 of said thermometer. Threaded into the end of the comb head 10 at 16 is a tubular extension 17 provided with spaced holes or apertures 18 in the wall thereof and threaded into the free end of this extension at 19 is a hard wood or other suitable heat resisting handle 20 which is axially bored to house the remainder of the aforesaid thermometer 13, a sealing plug 21 being threaded in said handle 22 and an asbestos cup or packing 23 accommodating the end of the thermometer tube so that end movement or lateral displacement thereof is entirely prevented. In order to provide an effective locking connection between the handle 20 and extension 17, I employ a sleeve 24 having an outwardly flared flange 25 for the purpose hereafter explained, and said sleeve is provided with alining bayonet slots 26, 27, in the former of which projects a pin or screw 28 secured in the outer end of the extension 17, whereby a longitudinally slidable and partially rotatable connection thereon is insured.

The other bayonet slot 27 is open ended at 29 so that it may be moved into and out of operative connection with a pin or screw 30 on the shank end of the handle 20. It is also to be noted that the locking sleeve 24 serves also by the provision of the flange 25, as an obstruction to prevent the fingers of the user of the comb from coming into contact with either the extension 17 or comb head 10.

Snugly fitting in the extension 17 and serving as a screen to prevent the ingress of dirt to the cooling chamber 31 through the holes or apertures 18, is a fine gauze tube 32 having an end wall 33 serving as a buffer or stop for an asbestos filler 34 which acts as a non-conductor or insulator between the comb head 10 and the handle 20. Obviously the filler 34 may be an asbestos tube or powdered asbestos packed in by the screwing of the handle 10 to the extension 17, and it is to be particularly noted that I find the cooling chamber 31 serves in a great measure to reduce the heat conductivity; while the filler 34 to all intents and purposes entirely eliminates any heat conductivity between the extension 17 and sleeve 24 as well as to the handle 20 through the thermometer 13.

In order that readings may be ascertained at a glance from the thermometer the handle 20 is cut away at 35, or it may be slotted in order that the degree markings 36 can be plainly seen and read with the naked eye.

From the foregoing it will be readily seen that by my invention, I provide a comb which can be heated in any appropriate manner to the requisite degree and used on extremely curly or kinky hair to straighten out the same without any liability of burning or damage thereto, by simply passing the teeth of the comb through the hair while holding it in such position that the comb head 10 presses against the roots and transmits heat thoroughly thereto, and at the same time smoothing out the hair with the smooth and evenly curved wiper shaped teeth 11.

It is also thought from the foregoing description that the advantages and novel features of my invention will be readily apparent and I desire it to be clearly understood that I do not limit myself to the precise details of construction or formation of the several parts, but consider myself at liberty to make such changes as will fall within the scope and ambit of the appended claims.

Having thus described my invention, what I claim as new and desire to secure by Letters Patent, is:

1. A comb of the type described comprising a cylindrical head having curved teeth projecting therefrom, a cylindrical extension at one end of the comb, a handle removably connected to the cylindrical extension and having a sight opening therein, and a thermometer axially disposed internally of the comb and handle member, the temperature gradations on said thermometer being in register with the aforesaid sight opening in the handle.

2. A comb of the type described comprising a hollow cylindrical head having curved teeth projecting at right angles therefrom, a perforate cylindrical extension at one end of the comb to constitute a cooling chamber, a handle removably connected to the cylindrical extension and having a longitudinally disposed sight opening therein, a thermometer housed axially longitudinal within the comb and handle the temperature gradations whereon register with the sight opening, and a heat insulator interposed within the comb head extension at the connection of the handle thereto.

3. A comb of the type described comprising a hollow cylindrical head having curved teeth projecting at right angles therefrom, a perforate cylindrical extension at one end of the comb to constitute a cooling chamber, a handle removably connected to the cylindrical extension and having a longitudinally disposed sight opening therein, a thermometer housed axially longitudinal within the comb and handle the temperature gradations whereof register with the sight opening, a heat insulator interposed within the comb head extension at the connection of the handle thereto, and a locking sleeve at the connection of the handle to the comb extension having a flange for preventing contact of the user's fingers and the heated comb.

4. An implement comprising a hairdressing device having a head containing an axial bore, a handle connected with said head and containing a bore communicating with the bore of said head, said handle having a sight opening communicating with the bore therein, in combination with a thermometer having its bulb disposed in the bore of said head and its tube disposed in the bore of said handle adjacent to said sight opening.

5. An implement comprising a hair dressing device having a recessed head, a cooling chamber communicating with said recess, and a recessed handle connected with said chamber and containing a sight opening, in combination with a thermometer having its bulb disposed in said head and its tube extending through said cooling chamber into said handle adjacent to said sight opening.

6. An implement comprising a hair dressing device having a head provided with teeth and containing an axial bore, a handle connected with said head and containing a bore communicating with the bore of said head, said handle having a sight opening communicating with the bore therein, in combination with a thermometer having its bulb disposed in the bore of said head above said teeth and its tube disposed in the bore of said handle adjacent to said sight opening, and a removable closure for an end of said bore to secure said thermometer therein.

In testimony whereof I have hereunto set my name this 23rd day of November, 1921.

WALTER H. SAMMONS.